(12) United States Patent  
Ju et al.

(10) Patent No.: US 9,231,356 B1  
(45) Date of Patent: Jan. 5, 2016

(54) ELECTRICAL CONNECTOR FOR TRANSFERRING HIGH FREQUENCY SIGNAL

(71) Applicant: LOTES CO., LTD, Keelung (TW)

(72) Inventors: Ted Ju, Keelung (TW); Wen Wei Lin, Keelung (TW); Li Ming Zhang, Keelung (TW); Chin Chi Lin, Keelung (TW)

(73) Assignee: LOTES CO., LTD., Keelung (TW)

( * ) Notice: Subject to any disclaimer, the term of this patent is extended or adjusted under 35 U.S.C. 154(b) by 0 days.

(21) Appl. No.: 14/604,021

(22) Filed: Jan. 23, 2015

Related U.S. Application Data

(60) Provisional application No. 62/024,728, filed on Jul. 15, 2014.

(51) Int. Cl.
```
H01R 24/00      (2011.01)
H01R 24/78      (2011.01)
H01R 12/50      (2011.01)
```
(52) U.S. Cl.
CPC ................ *H01R 24/78* (2013.01); *H01R 23/02* (2013.01); *H01R 23/7073* (2013.01)

(58) Field of Classification Search
USPC .............................................. 439/660, 924.1
See application file for complete search history.

(56) References Cited

U.S. PATENT DOCUMENTS

2012/0322306 A1* 12/2012 Tai ..................... H01R 13/6477
                                                 439/607.01

* cited by examiner

*Primary Examiner* — Tho D Ta
(74) *Attorney, Agent, or Firm* — Locke Lord LLP; Tim Tingkang Xia, Esq.

(57) ABSTRACT

An electrical connector includes a body having a tongue, a row of first terminals insert-molded in the body, a depressed slot, and a positioning slot. The tongue includes a first surface having multiple receiving slots. Each first terminal has a contact portion accommodated in the receiving slot and exposed from the first surface. The first terminals include a pair of differential signal terminals and multiple non-high-speed terminals. The depressed slot is depressed from the first surface, located between contact portions of two differential signal terminals, and in communication with two adjacent receiving slots. The positioning slot is depressed from the first surface, located between contact portions of two adjacent non-high-speed terminals, or of adjacent non-high-speed terminal and differential signal terminal, and in communication with two adjacent receiving slots. The length of the positioning slot is less than the length of the depressed slot.

19 Claims, 7 Drawing Sheets

ELECTRICAL CONNECTOR FOR TRANSFERRING HIGH FREQUENCY SIGNAL

CROSS-REFERENCE TO RELATED APPLICATION

This application claims priority to and the benefit of, pursuant to 35 U.S.C. §119(e), U.S. provisional patent application Ser. No. 62/024,728, filed Jul. 15, 2014, entitled "ELECTRICAL CONNECTOR," by Ted Ju, which is incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to an electrical connector, and particularly to an input/output connector for transmitting a high-speed signal.

BACKGROUND OF THE INVENTION

Serving as a standard input/output interface, a universal serial bus (USB) interface has been widely applied to various electronic devices. As the USB transmission rate is gradually improved, differential signal terminal pairs are correspondingly used in a USB connector to transmit a high frequency signal. Currently, a USB connector generally includes a body made of plastic and two rows of terminals disposed in the body. The body includes a base and a tongue extending forward from the base. The two rows of terminals are respectively disposed on upper and lower surfaces of the tongue, and each row of terminals includes a differential signal terminal pair. Two adjacent terminals of a same row of terminals are separated by a plastic material. In this type of structure, the differential signal terminal pair is surrounded by a lot of plastic, the attenuation action of plastic on the high frequency signal is great, and a small part of differential signal terminals are exposed to air, so that the insertion loss, the return loss and the crosstalk of the high frequency signal in a transmission process are affected, which is adverse to transmission of the high frequency signal.

Therefore, a heretofore unaddressed need exists in the art to address the aforementioned deficiencies and inadequacies.

SUMMARY OF THE INVENTION

In one aspect, the present invention is directed to an electrical connector, where differential signal terminals of the electrical connector are exposed to air to a great extent, so as to effectively improve the high frequency performance thereof.

In one embodiment, an electrical connector includes a body, a row of first terminals insert-molded in the body, a depressed slot, and at least one positioning slot. The body includes a tongue extending along a direction from front to rear. The tongue has a first surface, and multiple receiving slots are depressed from the first surface. Each of the first terminals has a contact portion correspondingly accommodated in one of the receiving slots and exposed from the first surface. The row of first terminals includes a pair of differential signal terminals for transmitting a high-speed signal and multiple non-high-speed terminals. The depressed slot is depressed from the first surface, and located between contact portions of two differential signal terminals. The depressed slot is in communication with two adjacent receiving slots. At least one positioning slot is depressed from the first surface. The positioning slot is located between contact portions of two adjacent non-high-speed terminals, or located between a contact portion of a non-high-speed terminal and a contact portion of a differential signal terminal adjacent to each other. The positioning slot is in communication with two adjacent receiving slots. The length of the positioning slot along the direction from front to rear is less than the length of the depressed slot along the direction from front to rear.

In one embodiment, side surfaces directly facing each other of contact portions of two differential signal terminals are exposed to the depressed slot.

In one embodiment, the multiple non-high-speed terminals are separately located at two sides of the pair of differential signal terminals. One such positioning slot is disposed between contact portions of two adjacent non-high-speed terminals, and one such positioning slot is disposed between contact portions of adjacent a non-high-speed terminal and a first differential signal terminal. The length of all of the positioning slots along the direction from front to rear is less than the length of the depressed slot along the direction from front to rear.

In one embodiment, the tongue has a second surface opposite to the first surface. The second surface is provided with a row of second terminals. Arrangement of the second terminals on the second surface and arrangement of the first terminals on the first surface are centrosymmetrical. A middle shielding sheet is disposed in the tongue and located between the first terminals and the second terminals. The depressed slot is depressed from the first surface and extends to a surface of the middle shielding sheet.

In one embodiment, the depressed slot runs forward through a front end of the tongue. The length of the depressed slot along the direction from front to rear is greater than the length of the contact portion of the differential signal terminal along the direction from front to rear. A front end of the depressed slot goes forward beyond a front end of the contact portion of the differential signal terminal, and a rear end of the depressed slot goes backward beyond a rear end of the contact portion of the differential signal terminal.

In one embodiment, the tongue has a second surface disposed opposite to the first surface. A groove is further depressed toward the second surface from each of the receiving slots at which the two differential signal terminals are located, and the groove is in communication with the receiving slot. The second surface is provided with a row of second terminals. Arrangement of the second terminals on the second surface and arrangement of the first terminals on the first surface are centrosymmetrical. The groove runs through to the second surface. A middle shielding sheet is disposed in the middle of the tongue and located between the first terminal and the second terminal. A location on the middle shielding sheet corresponding to the groove is provided with a hollow portion.

In another aspect, the present invention is directed to an electrical connector. In one embodiment, an electrical connector includes a body, a row of terminals fixedly disposed at the body, and a depressed slot. The body includes a tongue extending along a direction from front to rear. The tongue is provided with multiple receiving slots. Each of the terminals has a contact portion correspondingly accommodated in one of the receiving slots. The row of terminals includes a pair of differential signal terminals. The depressed slot is disposed at the tongue and located between contact portions of two differential signal terminals. The depressed slot is in communication with two adjacent receiving slots of the receiving slots.

In one embodiment, the tongue has an upper surface and a lower surface opposite to each other. The upper surface and the lower surface are each provided with a row of terminals, and the upper and lower rows of terminals are centrosymmetrically arranged.

In one embodiment, the depressed slot is depressed from the upper surface and/or lower surface of the tongue. The depth of the depressed slot in a vertical direction is greater than the thickness of the contact portion in the vertical direction. The tongue is provided with a through slot running through the upper surface and the lower surface. The through slot is located between differential signal terminals of the upper and lower rows of terminals, and the through slot is in communication with the receiving slot. A middle shielding sheet is disposed in the tongue and located between two rows of terminals. A location on the middle shielding sheet corresponding to the through slot is provided with a hollow portion.

In one embodiment, the depressed slot runs forward through a front end of the tongue.

In one embodiment, the row of terminals further includes non-high-speed terminals located at two sides of the differential signal terminal pair. A positioning slot is disposed between contact portions of two adjacent non-high-speed terminals, and a positioning slot is disposed between a contact portion of a non-high-speed terminal and a contact portion of a first differential signal terminal adjacent to each other. The positioning slot is in communication with two adjacent receiving slots. The length of the positioning slot along the direction from front to rear is less than the length of the depressed slot along the direction from front to rear.

Compared with the related art, in certain embodiments of the present invention, by disposing a depressed slot on the tongue corresponding to a location between two contact portions of a pair of differential signal terminals, plastic materials around the two differential signal terminals are reduced, so that the two differential signal terminals are exposed to air as much as possible, thereby effectively reducing the insertion loss and the return loss of a high frequency signal during transmission in these terminals.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-7. In accordance with the purposes of this invention, as embodied and broadly described herein, this invention, in one aspect, relates to an electrical connector.

As shown in FIG. 1 to FIG. 5, an electrical connector according to a first embodiment of the present invention includes a body 1, multiple terminals 2 fixedly disposed in the body 1, and a metal casing 3 covering the body 1.

Referring to FIG. 1 to FIG. 4, the body 1 is made of a plastic material, includes a base 10 and a tongue 11 extending forward from the base 10. The thickness of the base 10 in a vertical direction is greater than the thickness of the tongue 11. The entire tongue 11 is rectangular along a direction from front to rear, and the tongue 11 has an upper surface 112 and a lower surface 114 opposite to each other. The tongue 11 further has a direction from left to right perpendicular to the direction from front to rear and the direction from top to bottom (the vertical direction). For convenience of understanding, as shown in a three-dimensional coordinate system in FIG. 1, an X axis denotes a forward direction, a Y axis denotes a rightward direction, and a Z axis denotes an upward direction.

Multiple first receiving slots 14 are depressed from the upper surface 112 downward. Multiple second receiving slots 15 are further depressed from the lower surface 114 upward. The first receiving slots 14 and the second receiving slots 15 are used for accommodating a part of the terminals 2. The first receiving slot 14 has a bottom wall 140, the second receiving slot 15 has a top wall 150, and the depth of the first receiving slot 14 and the second receiving slot 15 is roughly consistent with the thickness of the terminal 2, and may be entered by the terminal 2, so that the terminals 2 are accommodated in the first receiving slots 14 and the second receiving slots 15. Meanwhile a part of each of the terminals 2 is exposed from the upper surface 112 and the lower surface 114 of the tongue 11. Four of the first receiving slots 14 and four of the second receiving slots 15 are used for accommodating high-speed differential signal terminals, and the four first receiving slots 14 and the four second receiving slots 15 are disposed at left and right sides of the tongue 11 pairwise.

A first groove 12 is further depressed from each of the foregoing four first receiving slots 14 downward and is in communication with the first receiving slot 14, and the first grooves 12 are filled with air. The four first grooves 12 are disposed on the upper surface 112 of the tongue 11 in two pairs, and the two pairs of first grooves 12 are separated by a distance. Correspondingly, a second groove 13 is further depressed from each of the foregoing four second receiving slots 15 upward and is in communication with the second receiving slot 15, and the second grooves 13 are likewise filled with air. The four second grooves 13 are disposed on the lower surface 114 of the tongue 11 in two pairs, and the two pairs of second grooves 13 are separated by a distance. The first grooves 12 and the second grooves 13 are corresponding in upper and lower locations, and extend along the direction from front to rear to be lengthwise rectangular. This embodiment serves as a preferable implementation manner, and to reduce the plastic amount at the location as much as possible, each of the first grooves 12 is in communication with the corresponding second groove 13 downward, thereby forming a through slot running through the upper and lower surfaces 112 and 114 of the tongue 11.

The depth of the four first receiving slots 14 and the four second receiving slots 15 in the vertical direction is far less than the depth of the first groove 12 and the second groove 13. Meanwhile, the width of the foregoing four first receiving slots 14 in the direction from left rightward is greater than the width of the first grooves 12, and the width of the second receiving slots 15 in the direction from left rightward is greater than the width of the second grooves 13, thereby forming a step between the bottom wall 140 of the first receiving slot 14 and the side wall of the corresponding first groove 12, and also forming a step between the top wall 150 of the second receiving slot 15 and the side wall of the corresponding second groove 13.

The multiple terminals 2 are divided into upper and lower rows 2A and 2B which are respectively fixedly disposed in the body 1. Each row of the terminals 2 includes high-speed terminals and non-high-speed terminals, where the high-speed terminals are differential signal terminals for transmitting a USB 3.0 signal. The upper row of the terminals 2A includes a pair of first differential signal terminals 21, and each of the first differential signal terminals 21 has a first contact portion 210 fixed to and exposed from the upper surface 112 of the tongue 11. The first contact portion 210 is partially accommodated in the first receiving slot 14, is correspondingly located above one of the first grooves 12, extends in a flat plate shape along the direction from front to rear, and therefore may cover the top opening of the entire first groove 12, so that the bottom surface of the first contact portion 210 is at least partially exposed to the air in the first groove 12. Correspondingly, the lower row of terminals 2B includes a pair of second differential signal terminals 22, and each of the second differential signal terminals 22 has a second contact portion 220 fixed to and exposed from the lower surface 114 of the tongue 11. The second contact portion 220 is partially accommodated in the second receiving slot 15, is correspondingly located below one of the second grooves 13, extends in a flat plate shape along the direction from front to rear, and therefore may cover the bottom opening of the entire second groove 13, so that the top surface of the second contact portion 220 is at least partially exposed to the air in the second groove 13. In this embodiment, the upper row of terminals 2A is insert-molded in the body 1, while the lower row of terminals 2B is assembled to the lower surface 114 of the tongue 11 upward from the bottom of the body 1. The two pairs of first grooves 12 corresponding to the upper surface 112 of the tongue 11 are disposed with two pairs of first differential signal terminals 21, and non-high-speed terminals are at two sides of each pair of first differential signal terminals 21. The two pairs of second grooves 13 corresponding to the lower surface of the tongue 11 are provided with two pairs of second differential signal terminals 22, and non-high-speed terminals are also at two sides of each pair of second differential signal terminals 22. More specifically, the upper and lower rows of terminals 2A and 2B on the upper and lower surfaces 112 and 114 are centrosymmetrically disposed. Each row of terminals 2A or 2B is sequentially provided from left to right with a grounding terminal, a pair of USB 3.0 terminals, a power supply terminal, a reserved terminal, a pair of USB 2.0 terminals, a reserved terminal, a power supply terminal, a pair of USB 3.0 terminals, and a grounding terminal.

The first contact portion 210 is partially accommodated in the first receiving slot 14, the bottom surface of the first contact portion 210 is supported by the bottom wall 140 of the first receiving slot 14, and the top surface of the first contact portion 210 is exposed from the upper surface 112 of the tongue 11. The first contact portion 210 has a first contact location used for contacting a mating element (not shown), and the first receiving slot 14 is located right below the first contact location. The second contact portion 220 is partially accommodated in the second receiving slot 15, the top surface of the second contact portion 220 is supported by the top wall 150 of the second receiving slot 15, and the bottom surface of the second contact portion 220 is exposed from the lower surface 114 of the tongue 11. The second contact portion 220 has a second contact location used for contacting a mating element, and the second receiving slot 15 is located right above the second contact location. Both the first contact portion 210 and the second contact portion 220 according to certain embodiment of the present invention are in a flat plate shape, and contact an elastic contact portion (not shown) bent in an arc shape on a mating terminal (not shown). When the elastic contact portion of the mating terminal is pressed against the first contact portion 210 and the second contact portion 220 in the flat plate shape, the bottom wall 140 of the first receiving slot 14 and the top wall 150 of the second receiving slot 15 may play a role of supporting the first contact portion 210 and the second contact portion 220 respectively, so as to prevent the first contact portion 210 and the second contact portion 220 from being depressed toward the center of the tongue 11, thereby avoiding that the first contact portion 210 and the second contact portion 220 are disconnected from the mating terminal.

A middle shielding sheet 4 located between the upper and lower rows of terminals 2A and 2B is further insert-molded in the body 1 according to certain embodiments of the present invention. The middle shielding sheet 4 is made of a metal material, and includes a main body portion 40 which is rectangular along the direction from front to rear, and two welding feet 41 bent downward and extending from a rear end of the main body portion 40 separately. The welding foot 41 is used for conducting a grounding path in a circuit board (not shown). The main body portion 40 of the middle shielding sheet 4 is located between the first differential signal terminals 21 and the second differential signal terminals 22, and is used for shielding an interference signal between the first differential signal terminals 21 and the second differential signal terminals 22, so as to alleviate crosstalk of a high frequency signal during the transmission process. In this embodiment, the middle shielding sheet 4 and the upper row of terminals 2A are jointly insert-molded in the tongue 11, while the lower row of terminals 2B is assembled to the lower surface 114 of the tongue 11 upward from the bottom of the body 1. To provide convenience for a die to position the upper row of terminals 2A in the insert-mold process, a location on the main body portion 40 of the middle shielding sheet 4 corresponding to the first groove 12 and the second groove 13 is provided with a hollow portion 42, and the hollow portion 42 enables the first groove 12 and the second groove 13 to be in communication with each other, and also provides convenience for a positioning pin of the die to be inserted from the lower surface 114 of the tongue 11 to press against the bottom surface of the first differential signal terminals 21 to position the first differential signal terminals 21, so that subsequently plastic is injected into a cavity of the die to form the body 1. The length of the hollow portions 42 in the direction from front to rear and the width thereof in the direction from left to right are slightly greater than those of the corresponding first groove 12 and second groove 13, and are also slightly greater than those of the corresponding first contact portion 210 and second contact portion 220.

Referring to FIG. 2 to FIG. 5, to further increase the exposure area of each differential signal terminal in the air, and reduce the loss of a high frequency signal between two terminals of a pair of differential signal terminals as much as possible, a depressed slot 16 is further depressed from the upper surface 112 of the tongue 11 between two first differential signal terminals 21. The depressed slot 16 is in communication with two adjacent first receiving slots 14, and side surfaces directly facing each other of the first contact portions 210 of the two first differential signal terminals 21 are exposed to the depressed slot 16, so that the side surfaces are at least partially exposed to the air. To make the side surfaces be exposed to the air as much as possible, the depressed slot 16 is depressed downward from the upper surface 112 and extends to the upper surface of the middle shielding sheet 4, and the depth thereof is greater than the thickness of the first contact portions 210 in the vertical direction.

Figure 1:
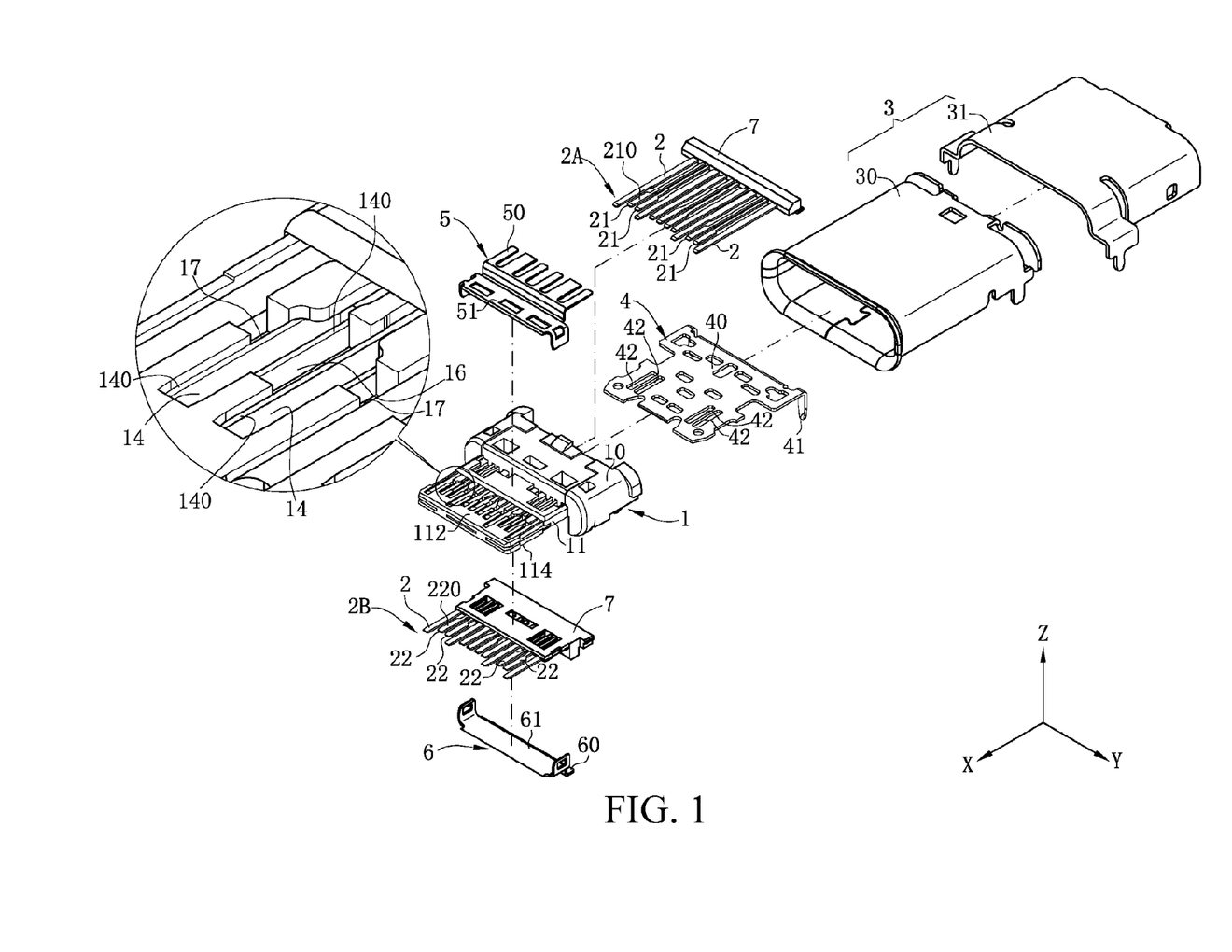
FIG. 1 is a schematic exploded view and a partial enlarged view of an electrical connector according to a first embodiment of the present invention.
Figure 2:
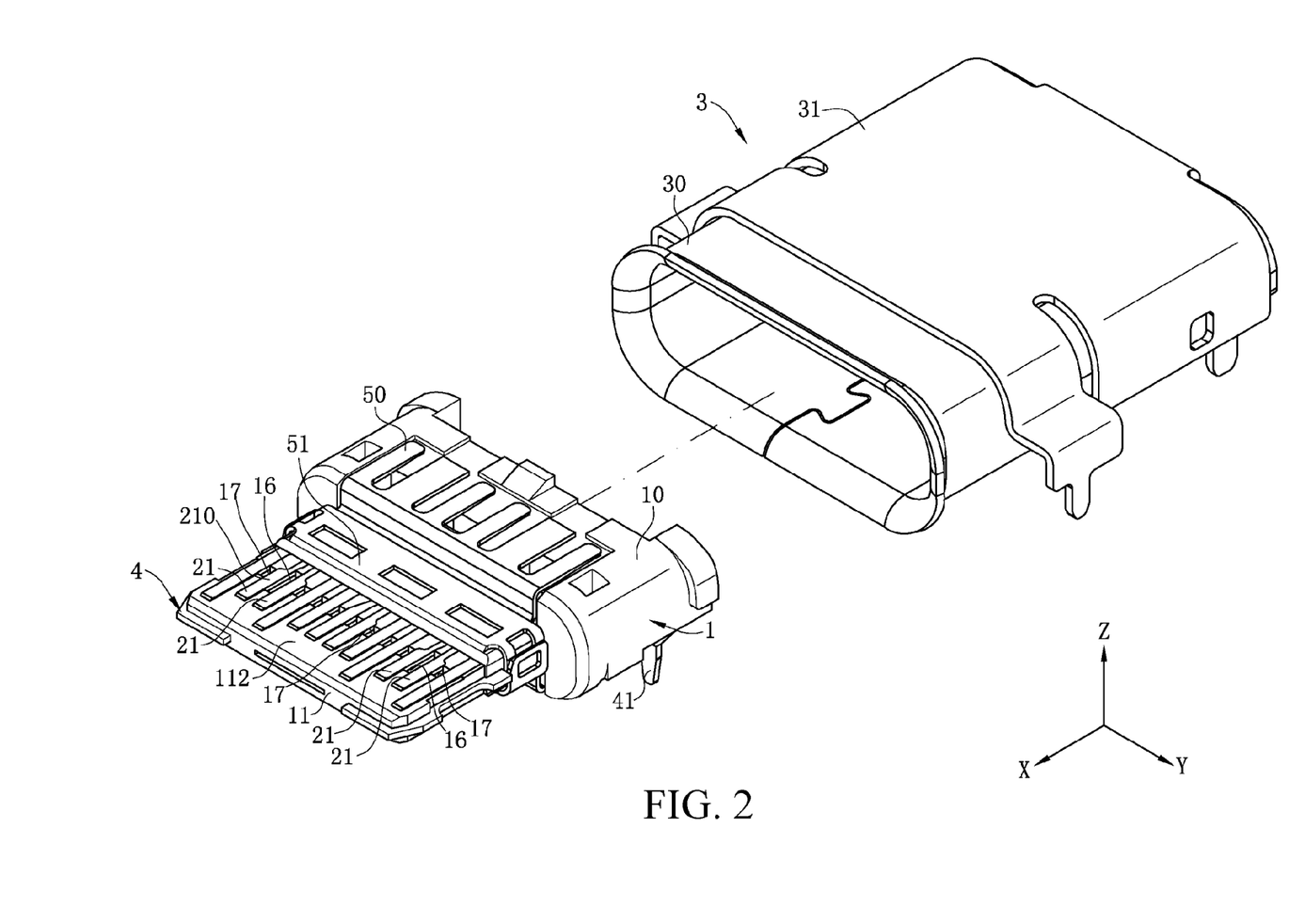
FIG. 2 is a schematic view obtained after upper and lower rows of terminals are fixed to a body, and upper and lower shielding sheets are fixed to the body in FIG. 1.
Figure 3:
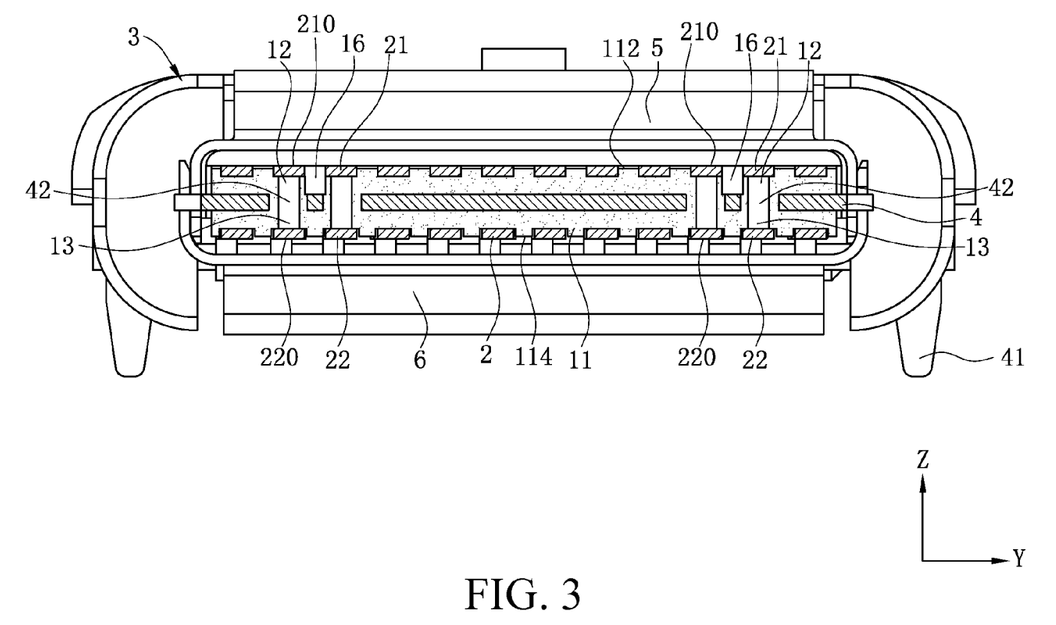
FIG. 3 is a sectional view obtained after a metal casing is assembled to the body in FIG. 2.
Figure 4:
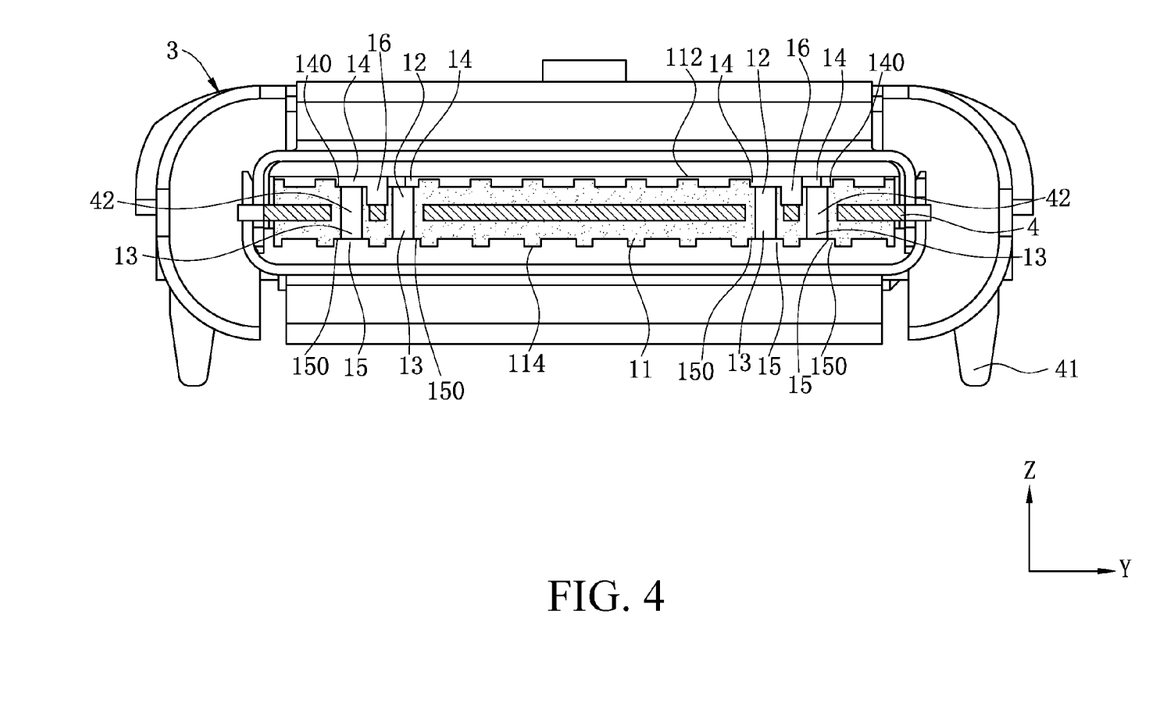
FIG. 4 is a sectional view obtained after terminals are hidden in FIG. 3.
Figure 5:
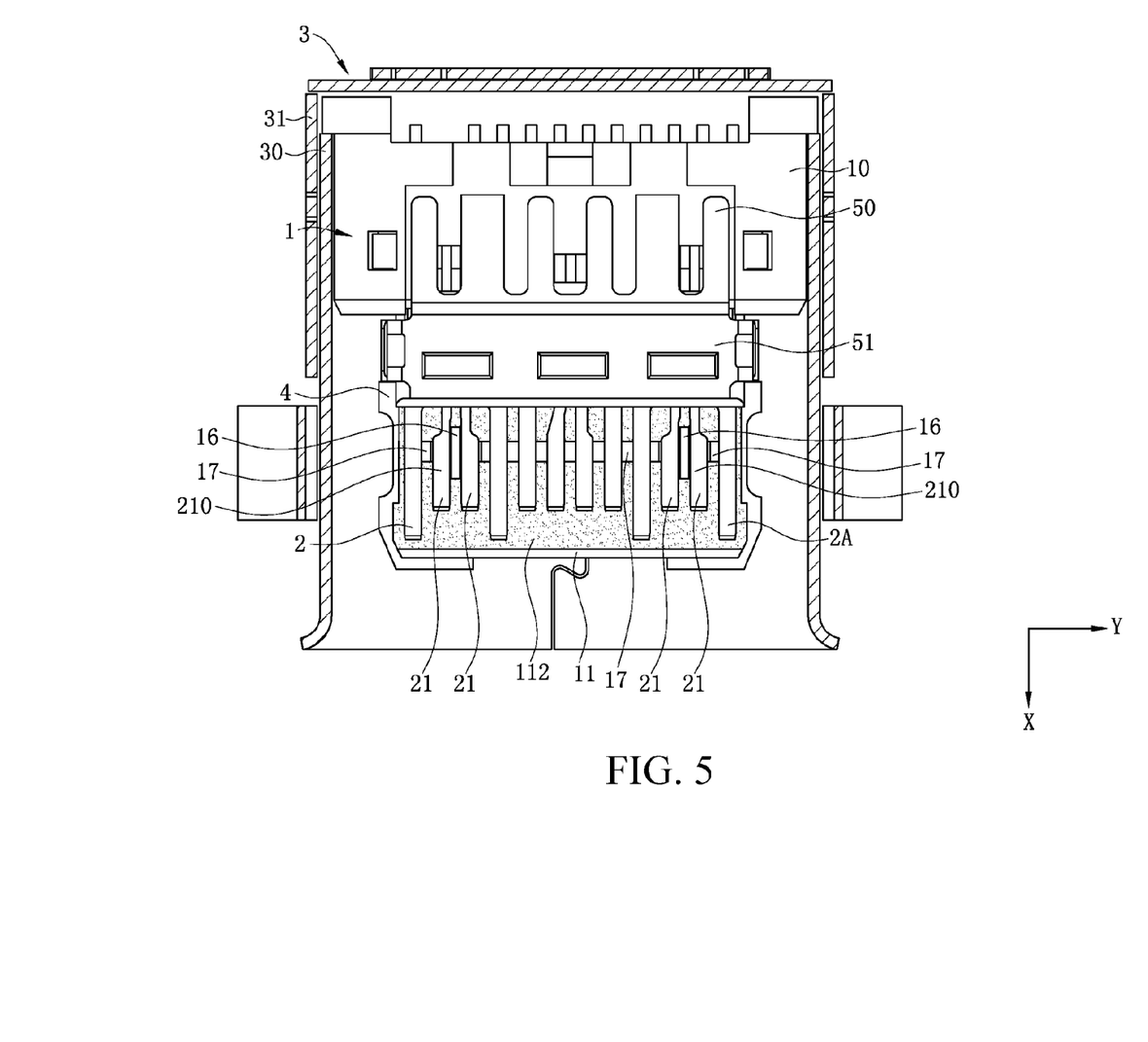
FIG. 5 is a top sectional view obtained after a metal casing is assembled to the body in FIG. 2.

In one embodiment, multiple positioning slots 17 are further depressed from the upper surface 112. The positioning slots 17 are located between two adjacent non-high-speed terminals and between a non-high-speed terminal and a first differential signal terminal 21 adjacent to each other. The positioning slots 17 are also in communication with the two adjacent first receiving slots 14. In the process of insert-molding the upper row of terminals 2A, the positioning pin of the die may be inserted into left and right sides (that is, locations of the positioning slots 17) of each terminal 2 from the upper surface 112 of the tongue 11, thereby limiting each terminal 2 in the horizontal direction, so as to prevent the terminals 2 from being deformed or warped due to a high temperature when a fused plastic material is injected. The length of at least one positioning slot 17 along the direction from front to rear is less than the length of the depressed slot 16 along the direction from front to rear. To make the differential signal terminals be exposed to the air as much as possible, the depressed slot 16 is set to be long, and meanwhile, in order to prevent interference between non-high-speed terminals, and interference between a non-high-speed terminal and a first differential signal terminal 21, the positioning slot 17 is set to be short as much as possible, so that in this embodiment, the length of all of the positioning slots 17 is less than the length of the depressed slots 16. For convenience of reserving a small part of plastic to fix the first contact portions 210, the whole length of the depressed slot 16 is less than the length of the corresponding first contact portions 210. As shown in FIG. 5, the rear end of the depressed slots 16 goes backward beyond the rear end of the first contact portions 210 of the first differential signal terminals 21, but the front end of the depressed slots 16 does not go forward beyond the front end of the first contact portions 210 of the first differential signal terminals 21, and the whole length thereof is less than the length of the first contact portions 210.

In one embodiment, an upper shielding sheet 5 and a lower shielding sheet 6 are separately disposed on the body 1. The upper and lower shielding sheets 5 and 6 are buckled and connected at a side of the tongue 11 by using a buckling structure. The upper and lower shielding sheets 5 and 6 respectively have urging portions 50 and 60 fixed to surfaces of the base 10 of the body 1. Fixing portions 51 and 61 covering the upper and lower surfaces 112 and 114 of the tongue 11 separately extend forward from the urging portions 50 and 60. Moreover, the urging portions 50 and 60 of the upper and lower shielding sheets 5 and 6 separately contact the metal casing 3, and are used for implementing grounding conduction. The metal casing 3 includes an inner shell 30 and an outer shell 31 covering the inner shell 30. The inner shell 30 is cylindrical and covers the entire body 1, and a front end opening thereof is used for the mating element to be inserted therein. The outer shell 31 may be fixed to the inner shell 30 in a spot welding or another manner, and DIP-type welding feet extend downward from two sides of the outer shell 31, and are used for electrically conducting the grounding path on the circuit board.

The molding manner of the electrical connector according to certain embodiments of the present invention is roughly as follows.

First, multiple terminals 2 are divided into an upper row and a lower row, which are each insert-molded at an insulation block 7, so that these terminals 2 and the insulation blocks 7 form an upper terminal module and a lower terminal module. Secondly, the upper terminal module and a middle shielding sheet 4 are jointly insert-molded in a body 1, so that the terminals 2 in the upper terminal module are exposed from an upper surface 112 of a tongue 11, and the middle shielding sheet 4 is fixedly disposed in the middle of the tongue 11. Then, the lower terminal module is assembled to a lower surface 114 of the tongue 11 upward. After that, upper and lower shielding sheets 5 and 6 are respectively fixed to the upper and lower surfaces of the body 1, and are buckled to each other. Finally, a metal casing 3 sleeves the body 1, so that an inner shell 30 separately contacts the upper and lower shielding sheets 5 and 6.

Figure 6:
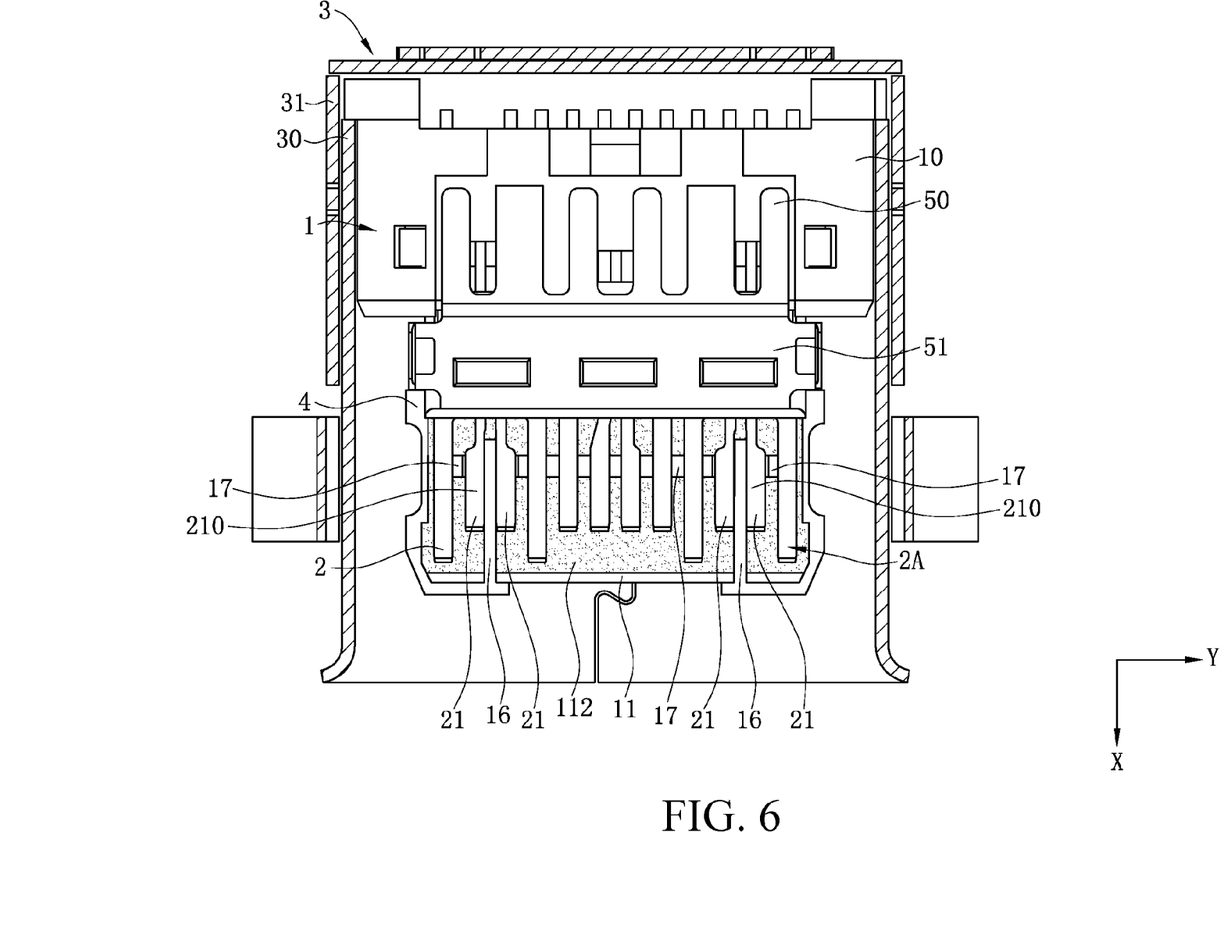
FIG. 6 is a top sectional view of an electrical connector according to a second embodiment of the present invention.
Figure 7:
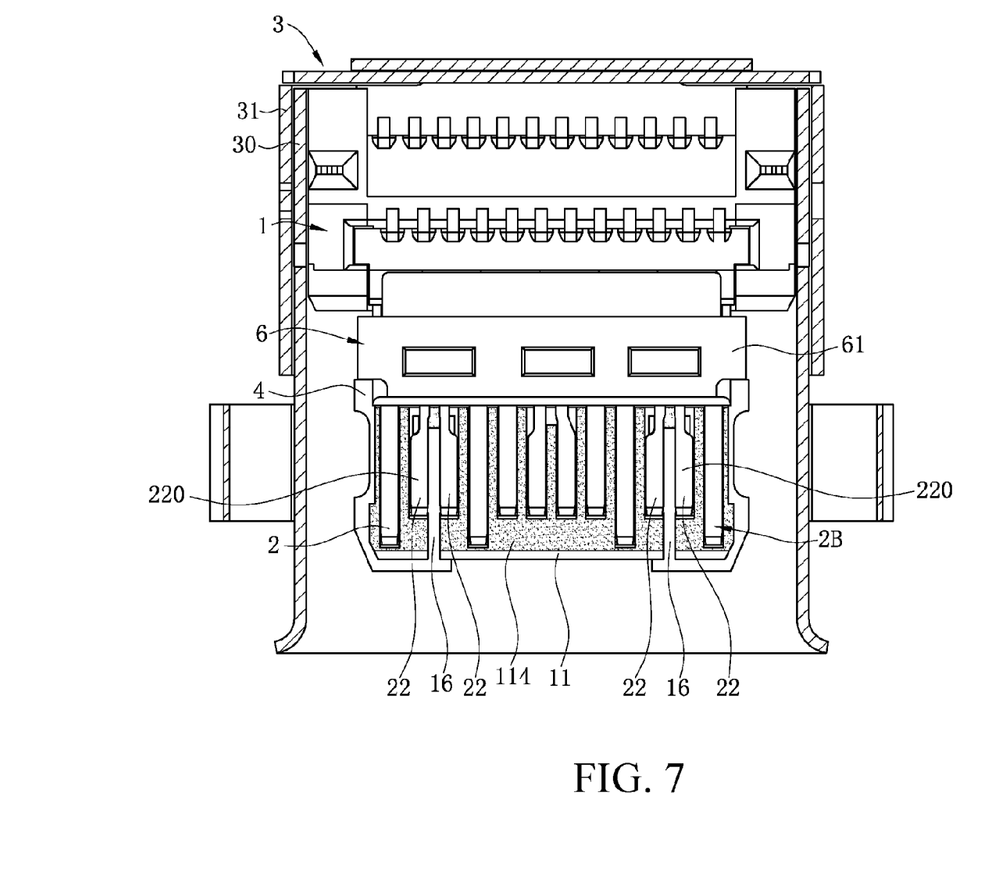
FIG. 7 is a bottom sectional view of the electrical connector of FIG. 6.

FIG. 6 and FIG. 7 show a second embodiment of an electrical connector of the present invention. A first difference between the second embodiment and the first embodiment lies in that the depressed slot 16 runs forward through a front end of the tongue 11. Specifically, the depressed slot 16 is depressed from the upper surface 112. The depressed slot 16 extends downward to the upper surface of the middle shielding sheet 4. The depth thereof is greater than the thickness of the first contact portions 210 in the vertical direction. The length of the depressed slot 16 along the direction from front to rear is greater than the length of the first contact portions 210 of the first differential signal terminals 21 along the direction from front to rear. The front end of the depressed slot 16 goes forward beyond the front end of the first contact portions 210 of the first differential signal terminals 21, and the rear end of the depressed slot 16 goes backward beyond the rear end of the first contact portion 210s of the first differential signal terminals 21.

As shown in FIG. 7, a second difference between this embodiment and the first embodiment lies in that the lower surface 114 of the tongue 11 is also provided with the depressed slot 16 running forward through between the second contact portions 220 of each pair of second differential signal terminals 22. The depressed slot 16 is depressed upward from the lower surface 114 and extends to the lower surface of the middle shielding sheet 4 (that is, the depressed slot 16 of the upper surface 112 of the tongue 11 and the depressed slot 16 of the lower surface 114 are separated by the middle shielding sheet 4), and the depth thereof is greater than the thickness of the second contact portions 220 in the vertical direction. The length of the depressed slot 16 along the direction from front to rear is greater than the length of the second contact portions 220 of the second differential signal terminals 22 along the direction from front to rear, the front end of the depressed slot 16 goes forward beyond the front end of the second contact portions 220 of the second differential signal terminals 22, and the rear end of the depressed slot 16 goes backward beyond the rear end of the second contact portions 220 of the second differential signal terminals 22. The foregoing depressed slot 16 running forward through the front end of the tongue 11 may be formed by placing the entirety of the terminals 2 and the body 1 at a milling machine and machining the designated location of the body 1 by using a milling cutter after the terminals 2 are fixed to the body 1.

In this embodiment, each depressed slot 16 runs forward through the front end of the tongue 11, and therefore side surfaces directly facing each other of the contact portions 210 and 220 of each pair of differential signal terminals 21 and 22 are all basically exposed to the air, so as to sufficiently increase the exposure extent of the differential signal terminals in the air, and more effectively reduce the insertion loss and the return loss of the high frequency signal during transmission in these terminals.

In other embodiments, both the upper row of terminals 2A and the lower row of terminals 2B may also be fixed to the tongue 11 in an assembly manner, the middle shielding sheet 4 may also be not provided with any hollow portion 42, and the first groove 12 may also be not in communication with the second groove 13.

Certain embodiments of the present invention, among other things, have the following beneficial advantages.

1. A depressed slot 16 is correspondingly disposed in a tongue 11 between two first contact portions 210 of a pair of first differential signal terminals 21, and plastic materials around the two first differential signal terminals 21 are reduced, so that the two first differential signal terminals 21 are exposed to the air as much as possible, thereby effectively reducing the insertion loss and the return loss of a high frequency signal during transmission in these terminals.

2. The length of the positioning slot 17 is less than the length of the depressed slot 16, to make the depressed slot 16 be set to be as long as possible, and the positioning slot 17 be set to be as short as possible, so that interference between non-high-speed terminals, and interference between a non-high-speed terminal and a first differential signal terminal 21 may be prevented.

3. The middle shielding sheet 4 is disposed between the upper and lower rows of terminals 2A and 2B, so that the middle shielding sheet 4 can shield an interference signal between different upper and lower differential signal terminal pairs, so as to alleviate crosstalk in the process of transmitting a high frequency signal.

4. Side surfaces directly facing each other of the first contact portions 210 of the two first differential signal terminals 21 are exposed to the depressed slot 16, so that the side surfaces are at least partially exposed to the air. The depressed slot 16 is depressed downward from the upper surface 112 and extends to the upper surface of the middle shielding sheet 4, and the depth thereof is greater than the thickness of the first contact portions 210 in the vertical direction, so that the side surfaces may be exposed to the air as much as possible, so as to more effectively reduce the insertion loss and the return loss of the high frequency signal during transmission in these terminals.

5. The upper surface 112 and the lower surface 114 of the tongue 11 are respectively provided with the first receiving slots 14 and the second receiving slots 15 corresponding to the first differential signal terminals 21 and the second differential signal terminals 22, so when the elastic contact portion of the mating terminal is pressed against the first contact portions 210 and the second contact portions 220 in a flat plate shape, the bottom walls 140 of the first receiving slots 14 and the top walls 150 of the second receiving slots 15 may play a role of supporting the corresponding first contact portions 210 and the second contact portions 220, thereby preventing the first contact portions 210 and the second contact portions 220 from being depressed toward the center of the tongue 11, so as to avoid that the first contact portions 210 and the second contact portions 220 are disconnected from the mating terminal.

6. A molding manner in which both the middle shielding sheet 4 and the upper row of terminals 2A are insert-molded in the tongue 11, and the second differential signal terminals 22 are assembled to the lower surface 114 is most preferably used in certain embodiments of the present invention. Compared with a manner in which the upper and lower rows of terminals 2A and 2B are fixed to the tongue 11 in an assembly manner, this manner can ensure the strength of the tongue 11 (since the tongue 11 needs to be thinned or dug when the upper and lower terminal modules are assembled to the tongue 11). Compared with a manner in which the upper and lower rows of terminals 2A and 2B are fixed to the tongue 11 in an insert-mold manner, this manner may ensure that the terminals 2 are stably held and not damaged on the tongue 11 (since two sets of dies are required to position the upper and lower rows of terminals when the upper and lower terminal modules and the tongue 11 are combined in an insert-mold manner, and the dies easily crush terminals in the second molding process). Meanwhile production costs are reduced.

7. The depressed slot 16 runs forward through the front end of the tongue 11, the length of the depressed slot 16 along the direction from front to rear is greater than the length of the corresponding first contact portions 210 of the first differential signal terminals 21 along the direction from front to rear, the front end of the depressed slot 16 goes forward beyond the front end of the corresponding first contact portions 210 of the first differential signal terminals 21, and the rear end of the depressed slot 16 goes backward beyond the rear end of the corresponding first contact portions 210 of the first differential signal terminals 21, so that side surfaces directly facing each other of the contact portions 210 and 220 of the pairs of first and second differential signal terminals 21 and 22 are all basically exposed to the air, so as to sufficiently increase the exposure extent of the differential signal terminals in the air, and more effectively reduce the insertion loss and the return loss of the high frequency signal during transmission in these terminals.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
   a body having a tongue extending along a direction from front to rear, wherein the tongue comprises a first surface, and a plurality of receiving slots are depressed from the first surface;
   a row of first terminals insert-molded in the body, wherein each of the first terminals has a contact portion respectively accommodated in one of the receiving slots and exposed from the first surface, and the row of first terminals comprises a pair of differential signal terminals for transmitting a high-speed signal and a plurality of non-high-speed terminals;
   a depressed slot, depressed from the first surface, and located between the contact portions of the two differential signal terminals, wherein the depressed slot is in communication with two adjacent receiving slots of the receiving slots; and
   at least one positioning slot depressed from the first surface, wherein the positioning slot is located between the contact portions of two adjacent non-high-speed terminals, or located between contact portions of one of the non-high-speed terminals and one of the pair of differential signal terminal adjacent to each other, and the positioning slot is in communication with two adjacent receiving slots,
   wherein a length of the positioning slot along the direction from front to rear is less than a length of the depressed slot along the direction from front to rear.

2. The electrical connector according to claim 1, wherein side surfaces directly facing each other of contact portions of two differential signal terminals are exposed to the depressed slot.

3. The electrical connector according to claim 1,
   wherein the plurality of non-high-speed terminals are respectively located at two sides of the pair of differential signal terminals;
   wherein one of the at least one positioning slot is disposed between the contact portions of two adjacent non-high-speed terminals, and another one of the at least one positioning slot is disposed between contact portions of one of the non-high-speed terminals and one of the pair of differential signal terminals adjacent to each other; and
   wherein the length of all of the positioning slots along the direction from front to rear is less than the length of the depressed slot along the direction from front to rear.

4. The electrical connector according to claim 1, wherein the depressed slot runs forward through a front end of the tongue.

5. The electrical connector according to claim 1, wherein the length of the depressed slot along the direction from front to rear is greater than a length of the contact portion of the differential signal terminal along the direction from front to rear.

6. The electrical connector according to claim 1, wherein a front end of the depressed slot goes forward beyond front ends of the contact portions of the differential signal terminals, and a rear end of the depressed slot goes backward beyond rear ends of the contact portions of the differential signal terminals.

7. The electrical connector according to claim 1, wherein the tongue has a second surface opposite to the first surface, the second surface is provided with a row of second terminals, and arrangement of the second terminals on the second surface and arrangement of the first terminals on the first surface are centrosymmetrical.

8. The electrical connector according to claim 7, further comprising a middle shielding sheet disposed in the tongue and located between the first terminals and the second terminals.

9. The electrical connector according to claim 8, wherein the depressed slot extends to a surface of the middle shielding sheet.

10. The electrical connector according to claim 1, wherein the tongue has a second surface opposite to the first surface, and a groove is further depressed toward the second surface from each of the receiving slots at which the two differential signal terminals are located, and the groove is in communication with the receiving slot.

11. The electrical connector according to claim 10, wherein the second surface is provided with a row of second terminals, arrangement of the second terminals on the second surface and arrangement of the first terminals on the first surface are centrosymmetrical, and the groove runs through to the second surface.

12. The electrical connector according to claim 11, further comprising a middle shielding sheet disposed in the middle of the tongue and located between the first terminals and the second terminals, wherein a location on the middle shielding sheet corresponding to the groove is provided with a hollow portion.

13. An electrical connector, comprising:
    a body having a tongue extending along a direction from front to rear and a plurality of receiving slots disposed in the tongue;
    a row of terminals fixedly disposed at the body, wherein each of the terminals has a contact portion accommodated in one of the receiving slots respectively, and the row of terminals comprises a pair of differential signal terminals; and
    a depressed slot, disposed at the tongue, and located between the contact portions of the two differential signal terminals, wherein the depressed slot is in communication with two adjacent receiving slots of the receiving slots,
    wherein the tongue has an upper surface and a lower surface opposite to each other, the upper surface and the lower surface are each provided with the row of terminals, and the upper and lower rows of terminals are centrosymmetrically arranged.

14. The electrical connector according to claim 13, wherein the depressed slot is depressed from at least one of the upper surface and the lower surface of the tongue.

15. The electrical connector according to claim 13, wherein a depth of the depressed slot in a vertical direction is greater than a thickness of the contact portion in the vertical direction.

16. The electrical connector according to claim 13, wherein the depressed slot runs forward through a front end of the tongue.

17. The electrical connector according to claim 13, wherein the tongue comprises a through slot running through the upper surface and the lower surface, the through slot is located between differential signal terminals of the upper and lower rows of terminals, and the through slot is in communication with the receiving slot.

18. The electrical connector according to claim 17, further comprising a middle shielding sheet disposed in the tongue and located between two rows of terminals, wherein a location on the middle shielding sheet corresponding to the through slot is provided with a hollow portion.

19. An electrical connector, comprising:
    a body having a tongue extending along a direction from front to rear and a plurality of receiving slots disposed in the tongue;
    a row of terminals fixedly disposed at the body, wherein each of the terminals has a contact portion accommodated in one of the receiving slots respectively, and the row of terminals comprises a pair of differential signal terminals; and
    a depressed slot, disposed at the tongue, and located between the contact portions of the two differential signal terminals, wherein the depressed slot is in communication with two adjacent receiving slots of the receiving slots,
    wherein the row of terminals further comprises non-high-speed terminals located at two sides of the pair of differential signal terminals;
    wherein a positioning slot is disposed between each of the contact portions of two adjacent non-high-speed terminals, and between the contact portion of one of the non-high-speed terminals and one of the differential signal terminals adjacent to each other, each positioning slot is in communication with two adjacent receiving slots; and
    wherein a length of the positioning slots along the direction from front to rear is less than a length of the depressed slots along the direction from front to rear.

* * * * *